United States Patent
Sadan et al.

(10) Patent No.: US 9,661,086 B2
(45) Date of Patent: May 23, 2017

(54) INCORPORATION OF CONTENT FROM AN EXTERNAL FOLLOWED USER WITHIN A SOCIAL NETWORKING SYSTEM

(71) Applicant: Facebook, Inc., Menlo Park, CA (US)

(72) Inventors: Yariv Sadan, San Francisco, CA (US); Zachary Rait, Palo Alto, CA (US); Austin Haugen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 329 days.

(21) Appl. No.: 13/756,122

(22) Filed: Jan. 31, 2013

(65) Prior Publication Data

US 2014/0214944 A1    Jul. 31, 2014

(51) Int. Cl.
*G06F 15/16* (2006.01)
*H04L 29/08* (2006.01)
*G06Q 50/00* (2012.01)

(52) U.S. Cl.
CPC ............. *H04L 67/22* (2013.01); *G06Q 50/01* (2013.01); *H04L 67/20* (2013.01)

(58) Field of Classification Search
CPC .......... H04L 67/22; H04L 67/20; G06Q 50/01
USPC .................. 709/204–207; 455/414
See application file for complete search history.

(56) References Cited

U.S. PATENT DOCUMENTS

| | | | |
|---|---|---|---|
| 8,171,128 B2 | 5/2012 | Zuckerberg et al. | |
| 8,249,943 B2 * | 8/2012 | Zuckerberg et al. | ........ 705/26.3 |
| 8,402,094 B2 | 3/2013 | Bosworth et al. | |
| 8,713,455 B2 * | 4/2014 | Wattenberg et al. | ......... 715/753 |
| 2006/0230061 A1 * | 10/2006 | Sample | .................. G06Q 10/10 |
| 2008/0182563 A1 * | 7/2008 | Wugofski | .............. G06Q 10/10 455/414.2 |
| 2009/0182589 A1 * | 7/2009 | Kendall | .................. G06Q 10/02 705/5 |
| 2009/0249451 A1 | 10/2009 | Su et al. | |
| 2009/0265431 A1 * | 10/2009 | Jania | .................... G06Q 10/107 709/206 |
| 2010/0332330 A1 | 12/2010 | Goel et al. | |
| 2011/0113113 A1 * | 5/2011 | Ryan et al. | ................... 709/206 |
| 2011/0154223 A1 * | 6/2011 | Whitnah | ................. H04L 51/32 715/753 |

(Continued)

FOREIGN PATENT DOCUMENTS

KR    10-2012-0105588 A    9/2012

OTHER PUBLICATIONS

PCT International Search Report and Written Opinion, PCT Application No. PCT/US2014/011506, May 12, 2014, ten pages.

(Continued)

*Primary Examiner* — Richard G Keehn
(74) *Attorney, Agent, or Firm* — Fenwick & West LLP

(57) ABSTRACT

A following user follows a followed user on a third-party application. The followed user may additionally approve the inclusion of content posted by the followed user on the third-party application within an account of any following users on the social networking system. Subsequent postings by the followed user on the third-party application cause the third-party application to notify the social networking system of the posting. The social networking system in turn incorporates the posting of the followed user on the third-party application into a user interface that it displays to the following user.

14 Claims, 4 Drawing Sheets

(56) References Cited

U.S. PATENT DOCUMENTS

| | | | |
|---|---|---|---|
| 2011/0238754 A1* | 9/2011 | Dasilva | G06F 17/3082 709/204 |
| 2011/0276396 A1* | 11/2011 | Rathod | G06F 17/30867 705/14.49 |
| 2012/0102114 A1* | 4/2012 | Dunn | G06Q 10/10 709/204 |
| 2012/0278476 A1* | 11/2012 | Agrawal et al. | 709/224 |
| 2012/0317631 A1* | 12/2012 | Assam | 726/7 |
| 2013/0031171 A1* | 1/2013 | Serena | 709/204 |
| 2013/0061296 A1* | 3/2013 | Reddy | H04L 51/02 726/5 |
| 2013/0073605 A1* | 3/2013 | Fosburgh | G06F 11/3013 709/202 |
| 2013/0080538 A1* | 3/2013 | McEachern | G06Q 50/01 709/206 |
| 2013/0090170 A1* | 4/2013 | Reed | A63F 13/12 463/42 |
| 2013/0159519 A1* | 6/2013 | Hochberg et al. | 709/225 |
| 2014/0067782 A1* | 3/2014 | Waupotitsch et al. | 707/706 |

OTHER PUBLICATIONS

Canadian Intellectual Property Office, Office Action, Canadian Patent Application No. 2,892,317, Aug. 1, 2016, two pages.

\* cited by examiner

200

Chatter

Welcome, Christian. — 201

Latest thoughts of people you're following

Recent posts

202A —  John Galt Vini, vidi, vici...

202B —  Donnae YS 1-0 in the 4th game!!! Do I sense a sweep coming on?

202C —  A. M. Pagal Stolen bases are even better than free tacos!

202D —  Alazar H. The new car actually looks pretty good in yellow!

202E —  Amber L. I just can't get enough of those Boxcar Children!

250

Social Network　　　　　*Welcome, Christian Konig!*

News Feed

| What's on your mind? |

 Bob Dupont  Out on a fishing trip.　　251A
26 minutes ago.  Comment . Like

Jim Smith likes this

 Bob Dupond  No way! So am I! What are the odds??

 Adam Lee  All tuckered out from pulling brush off our many acres.
55 minutes ago.  Comment . Like　　251B

 Christian Konig  See, THIS is why you're in better shape than I am! (Shouldn't you be practicing Java??)

 Angel Pagal  Stolen bases are even better than free tacos!
About an hour ago.  Comment . Like

INCORPORATION OF CONTENT FROM AN EXTERNAL FOLLOWED USER WITHIN A SOCIAL NETWORKING SYSTEM

BACKGROUND

The present invention generally relates to the field of electronic social networking systems, and more particularly, to integrating content posted by a user in a third-party application within a social networking system.

Many users of a social networking system, such as FACEBOOK, also have an account on a third-party application, such as TWITTER, FOURSQUARE, PINTEREST, or FLICKR. In many cases, such users "follow" another user on the third-party application (i.e., have registered an interest in content or activity of the other user), where the other user also has an account on the social networking system but is not a direct social connection of the user on the social networking system. (For purposes of brevity, the user that follows another user is hereinafter referred to as the "following" user, and the user that is followed is hereinafter referred to as the "followed" user.) For example, a user of the social networking system may follow a celebrity on the third-party application, but not be a friend or other form of direct social connection with the celebrity on the social networking system.

In such cases, the following users would often wish to see content provided by the followed users on the third-party social networking system—e.g., textual comments, reviews, posted links, pictures, or the like—directly within the following users' accounts on the social networking system. However, the lack of a direct social connection between the following user and the followed user on the social networking system, coupled with the fact that the information provided by the followed user is within the third-party social networking system rather than the first social networking system, typically means that the social networking system will not display such information to the following user.

SUMMARY

In embodiments of the invention, a following user follows a followed user on a third-party application. The followed user may additionally approve the inclusion of content posted by the followed user on the third-party application within an account of any following users on the social networking system. Subsequent postings by the followed user on the third-party application cause the social networking system to obtain the postings, e.g., by the third-party application notifying the social networking system of the posting. The social networking system in turn incorporates the posting of the followed user on the third-party application into a user interface that it displays to the following user.

In one embodiment, the followed user specifies a user identifier of the followed user on the social networking system to the third-party application, e.g., when approving the sharing of the followed user's posted content with the social networking system. The social networking system may use the user identifier of the followed user to display the posted content in association with an identity of the followed user on the social networking system, as opposed to the identity of the followed user on the third-party application.

BRIEF DESCRIPTION OF DRAWINGS

FIGS. 2A and 2B respectively illustrate sample user interfaces of a following user on a third-party application and on a social networking system, according to some embodiments.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
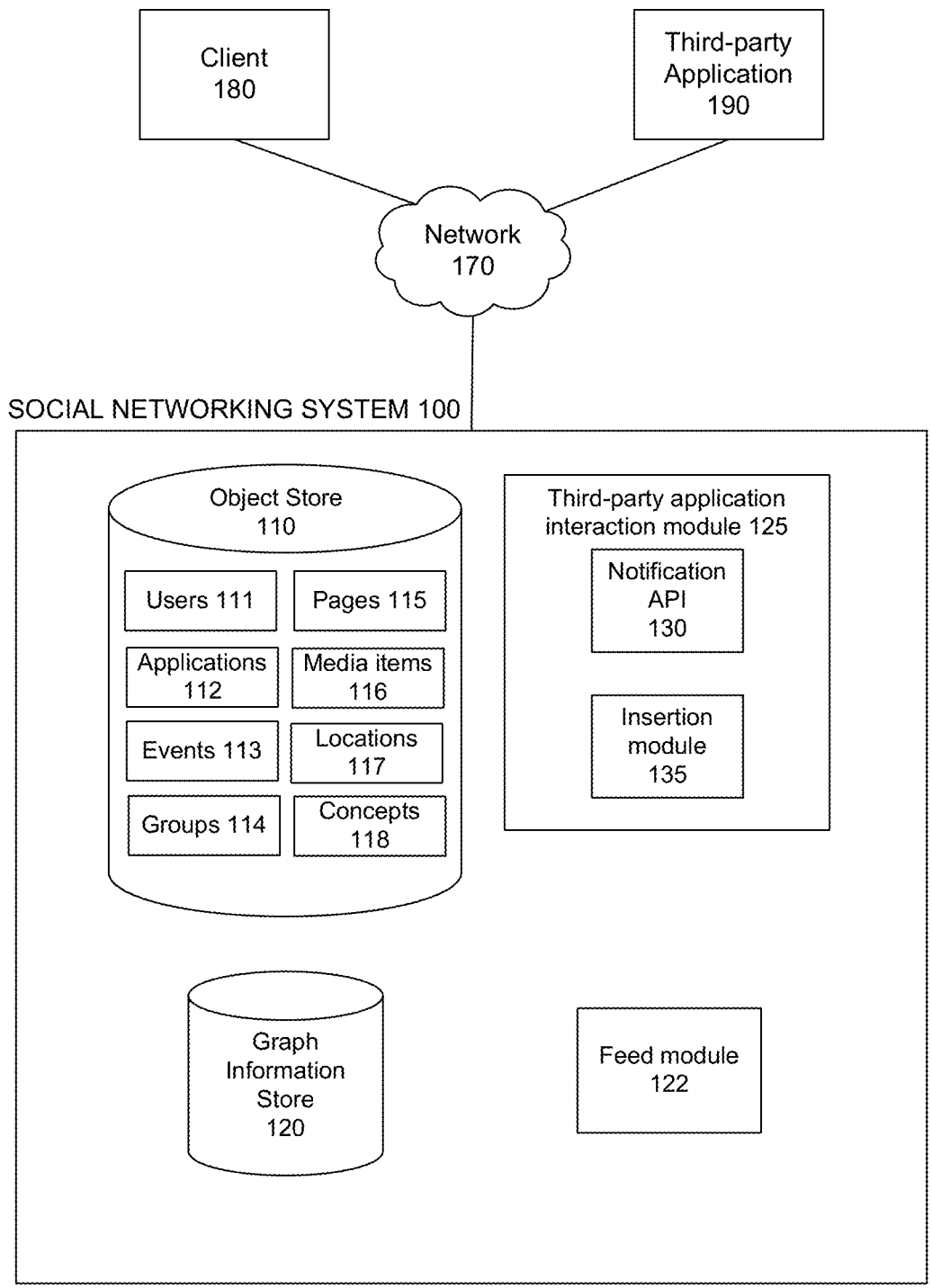
FIG. 1 is a high-level block diagram of a computing environment, according to one embodiment.

FIG. 1 is a high-level block diagram of a computing environment according to one embodiment. FIG. 1 illustrates a social networking system 100, a client device 180, and a third party application 190 connected by a network 170. A user of the client device 180 interacts with the social networking system 100 via an application such as a web browser, performing operations such as browsing content, posting messages, performing queries for people or other content of interest, and the like. The user can also use the client device 180 to interact with the third-party application 190. Additionally, the social networking system 100 and the third-party application 190 can exchange information about following and followed users and the content provided by the followed users on the third-party application. As a result of this information exchange, the social networking system 100 can automatically display, to a following user on the social networking system, content posted by the followed user within the third-party application.

The social networking system 100 comprises an object store 110 that stores information on various objects tracked by the social networking system 100. These objects may represent a variety of things with which a user may interact in the social networking system 100, including, without limitation, the user or other users 111 of the social networking system (represented, e.g., as a profile object for the user), applications 112 (e.g., a game playable within the social networking system), events 113 (e.g., a concert that users may attend), groups 114 to which users may belong (e.g., a group devoted to alternative energy research), pages 115 (e.g., pages constituting a particular person or organization's presence on the system, such as pages about particular politicians, car models, or TV shows), items of media 116 (e.g., pictures, videos, audio, text, or any other type of media content), locations 117 associated with a user (e.g., "San Jose, Calif., USA"), and concepts 118 or other terms (e.g., an object corresponding to the concept "alternative energy"). The object store 110 may further store objects representing other data routinely produced by users of the social networking system 100, such as inbox messages, status updates, comments, notes, and postings. An object in the object store 110 may represent an entity existing within the social networking system (e.g., an application 112 available on the social networking system), a virtual entity that exists outside the domain of the social networking system (e.g., a website), or a real-world entity (e.g., a person, a product, or a show). User objects 111 may represent an individual human person, but also may represent other entities, such as fictitious persons or concepts.

The object store 110 may store all of the objects existing within the social networking system 100, such as the code of an application 112, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "Al Gore" for a person or page 115, or "Green Energy Group" for a group 114), an image representing the object (e.g., a user profile picture), or one or more tags assigned to the object by users (e.g. the textual strings "game", "crime", and "strategy" for a strategy game application). Different types of objects may have different types of metadata, such as a set of associated users 111 for a group 114, a media type (e.g., "video") for a media item object 116, and a unique user ID and name tokens (e.g., separate first and last names "Al" and "Gore") for a user object 111.

In one embodiment the social networking system 100 further comprises a graph information store 120 that represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects 111 representing that the users have a relationship in the social networking system (e.g., are friends, or have communicated, viewed the other's profile, or interacted in some way), an edge between a user object 111 and an application object 112 representing that the user has used the application, and an edge between a user object 111 and a group object 114 representing that the user belongs to the group, and an edge between a user object 111 and a page object 115 representing that the user has viewed the page or expressly specified an affinity for the page (e.g., "Liked" the page). Additionally, an edge between a first user object 111 and a second user object 111 may specify that the first user is following the second user on a particular third-party application 190. A user 111 is considered a direct connection of another user in the social networking system 100 if there is an edge between the two users in the social graph, as opposed, for example, to there only being a series of edges that indirectly connect the users.

For example, if one user 111 establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. In a still further example, if a first user follows a second user within a third-party application 190, the social networking system 100 is notified of this fact, a unidirectional "following" edge may be created between from the first user to the second user within the graph information store 120. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" or "following" as the label between two user objects), and/or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

The social networking system 100 further comprises a feed module 122 that displays a list of relevant content items from the social networking system (a "feed") for a given user 111 to view within the user interface for the user's account on the social networking system. For example, the feed can include status messages of other users 111 of the social networking system 100, such as the user's first-order connections, as well as comments of other users thereto; recent events 113; recent actions of a given application 112; and the like. In one embodiment, the feed module 122 constructs a list of some number N of the most recent content items relevant to the given user, places them within a webpage, and provides the webpage to the client device 180 of the user.

The social networking system 100 further comprises a third-party application interaction module 125 that the social networking system 100 uses to display content of followed users from the third-party application 190 to the following users.

Specifically, the third-party application interaction module 125 comprises a notification API 130 that third-party applications 190 can use to inform the social networking system 100 of relevant events that occurred on the third-party applications, such as that a first (following) user has just begun to follow a second (followed) user on the third-party application, or that a followed user has just posted an item of content on the third-party application. In some embodiments, the third-party application interaction module 125 explicitly polls the relevant third-party applications 190 for new postings by followed users, rather than relying on the third-party applications to use the notification API 130 to inform the social networking system.

In one embodiment, the notification API 130 permits (or requires) the third-party application 190 to specify user identifiers of the followed and/or following users on both the third party application and the social networking system 100. For example, the notification API 130 may require that the third-party application 190 specify user identifiers of the following user on both the third-party application 190 and the social networking system 100 so that it can more easily correlate the two in future.

The third-party application interaction module 125 further comprises an insertion module 135 that inserts content of followed users on the third-party application 190 into the user interface associated with the following user on the social networking system 100. In one embodiment, the third-party interaction module 125 stores a copy of, or reference to, each content item posted on the third-party application 190 of which the third-party application has informed the social networking system 100 using the notification API 130. Then, when the feed module 122 is forming the appropriate feed for a given user, the feed module requests the insertion module 135 to provide any relevant content items from the third-party application 190 to be included in the feed. For example, the insertion module 135 might identify the most recent postings of users of the third-party application 190 that are followed by the user for whom the feed is being generated, including such postings within the feed if they have sufficiently recent posting dates to be within the feed's most recent N content items.

Sample User Interfaces

Figure 2A:
Figure 2A:
Figure 2A:
Figure 2A:
Figure 2A:

FIG. 2A illustrates a sample user interface 200 for an account of a following user on a third-party application 190, according to one embodiment. Specifically, a following user 201 named Christian Konig has an account on a third-party application 190 named Chatter and is following a number of other users who also have accounts on the third-party system. The user interface 200 displays recent postings 202A-202E of five of the users that the following user 201 is following.

FIG. 2B illustrates a sample user interface 250 for an account of the same following user on the social networking system 100, according to one embodiment. Specifically, a news feed of the social networking system 100 for the user named Christian Konig displays a number of recent postings 251 by other users 111 who have accounts on the social networking system 100. In particular, the user 111 corresponding to the posting 251C has an account on both the social networking system 100 and the Chatter third-party application 190 and has also approved his postings on Chatter to be displayed within the social networking system 100. Consequently, since as illustrated in FIG. 2A the following user 201 (Christian Konig) is following the user corresponding to posting 202C (A. M. Pagal), the posting 202C of that user on Chatter is also included in Christian Konig's news feed of the social networking system 100, as posting 251C. (Note that the social networking system 100 has attributed the posting to the account of the followed user on the social networking system 100—namely, the account having the user name "Angel Pagal"—rather than the account of the followed user on the third-party application 190—namely, the account having the name "A. M. Pagal.") Similarly, if the users corresponding to postings 202A, 202B, 202D, or 202E also had accounts on the social networking system 100 and approved sharing of their postings with the social networking system 100, then their postings would similarly be shown within the user interface 250.

Process Of Displaying Content

Figure 3:
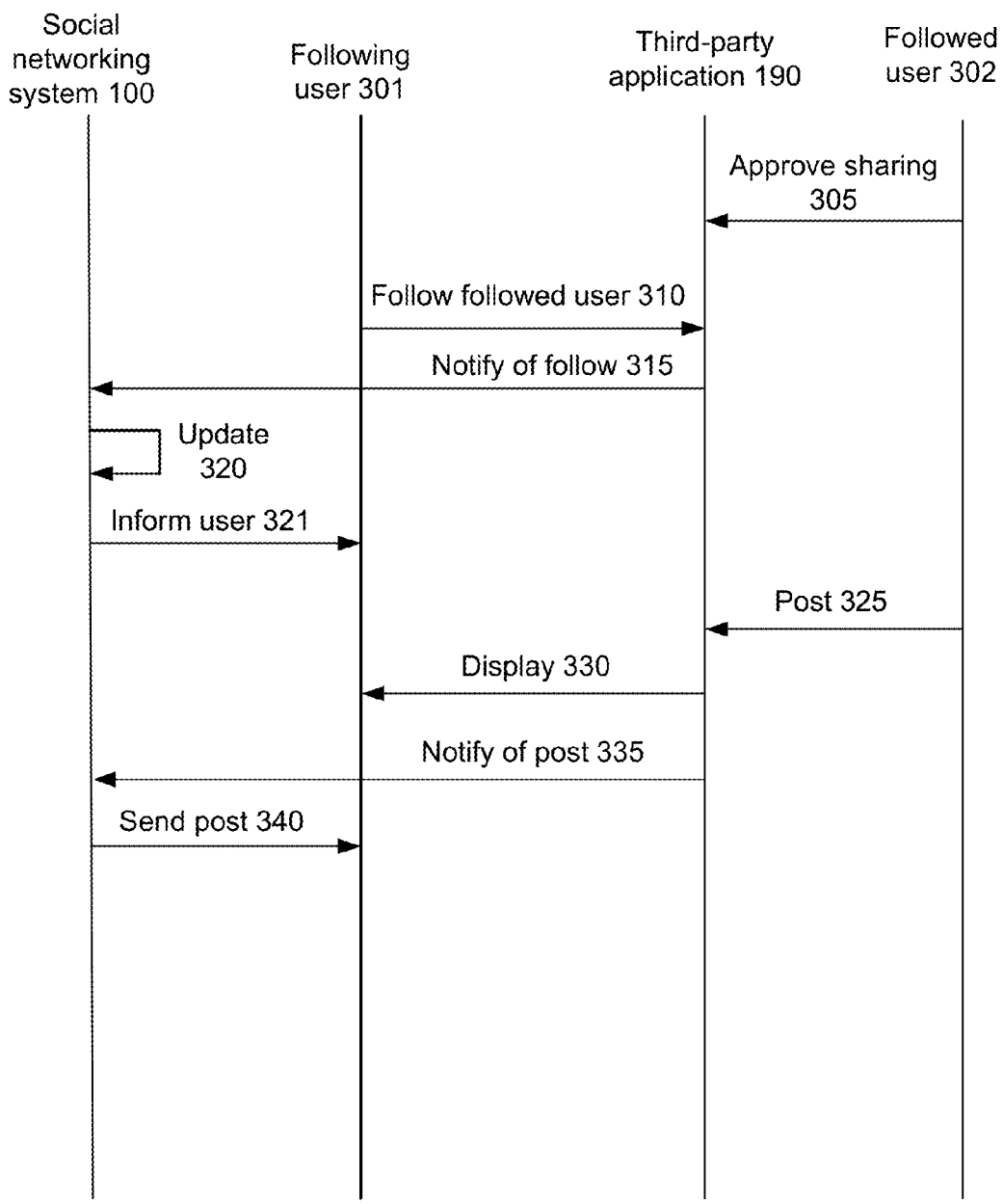
FIG. 3 illustrates interactions between the social networking system, the third-party application, a following user, and a followed user, when displaying content of the followed user on the social networking system, according to one embodiment.

FIG. 3 illustrates the interactions between the social networking system 100, the third-party application 190, a following user 301, and a followed user 302, when displaying content of the followed user on the social networking system 100, according to one embodiment.

Initially, the followed user 302 uses the third-party application 190 to approve 305 sharing of content posted by the followed user on the third-party application with the social networking system 100. For example, the followed user 302 may use an account settings user interface of the third-party application 190 to select the option "Allow my posts to be shared with my followers on S," where S is a given social networking system 100. As part of the approval 305, the followed user 302 may specify a user name or other user identifier that the followed user has on the social networking system 100. The specification of the user names or other identifiers permits the social networking system 100 to more easily map the identities of the users on the third-party application 190 to corresponding identities of the users on the social networking system.

At step 310, the following user 301 follows the followed user 302, e.g., indicates using the third-party application 190 that the following user wishes in future to see content posted by the followed user 302 within the third-party application.

In response to step 310, the third-party application 190 notifies 315 the social networking system 100 (e.g., using the notification API 130) that the following user 301 is now following the followed user 302. (In other embodiments, the social networking system 100 may explicitly poll the third-party application 190 to determine whether there are new "following" relationships since the last poll.) Accordingly, the social networking system 100 updates 320 the graph information store 120, e.g., by introducing an edge labeled "follow" and oriented from the following user 301 to the followed user 302.

The social networking system 100 may optionally inform 321 the following user 301 that the "follow" relationship will also be reflected within the social networking system 100, as well as within the third-party application 190. For example, the social networking system 100 could add an entry into the newsfeed of the following user 301, e.g., "Christian is now following Angel Pagal on Chatter," to refer back to the example of FIGS. 2A-2B.

Once the above steps have taken place, content posted by the followed user 302 on the third-party application 190 will be included for display to the following user 301 on the social networking system 100. Specifically, in step 325 the followed user 302 uses the third-party application 190 to post new content, which the third-party application 190 displays 330 to the following user 301 when the following user is logged into the third-party application, e.g., as the message 202C illustrated in FIG. 2A.

Accordingly, the third-party application 190 notifies 335 the social networking system 100 of the posting by the followed user 302 on the third-party application e.g., by calling the notification API 130. In one embodiment, as part of the notification the third-party application 190 explicitly provides a unique user ID for the account of the followed user 302 on the social networking system 100; this allows the social networking system to more easily determine the identity of the content poster on the social networking system. (In one embodiment, rather than relying on the third-party application 190 to inform it of new postings by followed users, the social networking system 100 explicitly polls the third-party application for the new postings.) In one embodiment, the social networking system 100 continues to store copies of, or references to, the postings of which is notified by the third-party application 190, making use of the stored postings only as needed, e.g., when the feed module 122 is generating the feed for a given user.

At an appropriate time, such as when generating the starting page on the social networking system for a following user 301, the social networking system uses the posting provided by the third-party application 190 and the unique user ID for the followed user 302 who generated the posting to provide 340 the posting to the following user 301. For example, the posting can be included within a news feed of the following user 301 along with the name of the followed user 302 on the social networking system 100, as described above with respect to the insertion module 135. (Further details regarding the use of the news feed are provided in U.S. Pat. No. 8,171,128 ("Systems and Methods for Providing Dynamically Selected Media Content to a User of an Electronic Device in a Social Network Environment") and U.S. Patent Application Publication No. 2008-0040475 ("Systems and Methods for Measuring User Affinity in a Social Network Environment"), which are hereby incorporated by reference.) For instance, in FIG. 2B the social networking system has displayed the posting (the textual message "Stolen bases are even better than free tacos!") in association with the name of the followed user 302 on the social networking system ("Angel Pagal", as opposed to the name "A. M. Pagal" of the followed user 302 on the third-party application 190 as depicted in FIG. 2A).

It is appreciated that although the steps of FIG. 3 can be performed in the particular order illustrated, in other embodiments they might alternatively be performed in different orders, or by different actors, or not performed at all. For example, the social networking system 100 might query a third-party application 190 for new postings, rather than the third-party application proactively notifying the social networking system of the new postings. As a further example, the social networking system 100 might not explicitly inform 321 the user of the "following" relationship on the third-party application 190.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method performed by a social networking system, comprising:
   receiving, by the social networking system, from a remote third-party system hosting a third-party application, the remote third-party system different from the social networking system, a notification that a first user has a unidirectional connection with a second user on the third-party application, wherein the first user has a first social networking user account on the social networking system and the second user has a second social networking user account on the social networking system that is different from the first social networking user account, and wherein the first user has a first third-party user account on the third-party system and the second user has a second third-party user account on the third-party system;
   receiving, from the third-party application, a notification that the second user has posted content on the third-party application;
   generating a feed for the first user, the feed comprising a post that contains at least a portion of the content posted by the second user on the third-party application, the post being attributed to the second social networking user account of the second user; and
   sending the feed for display to a client device of the first user, wherein the social networking system and the remote third-party system are different from the client device of the first user.

2. The computer-implemented method of claim 1, further comprising:
   receiving, from the third-party application, an identifier of the account of the second user on the third-party application and an identifier of an account of the second user on the social networking system; and
   storing a mapping comprising:
      the identifier of the account of the second user on the third-party application, and
      the identifier of the account of the second user on the social networking system.

3. The computer-implemented method of claim 2, wherein the notification that the second user has posted content on the third-party application comprises an identifier of the second user on the third-party application, the method further comprising:
   determining the identifier of the account of the second user on the social networking system using the stored mapping; and
   attributing the post to the user account of the second user on the social networking system by displaying, in visual association with the at least a portion of the content, a user name of the user account of the second user on the social networking system.

4. The computer-implemented method of claim 1, further comprising:
updating a social graph of the social networking system to indicate that the first user is following the second user; and
determining, based on the social graph, that the content posted by the second user should be included in the feed for the first user.

5. The computer-implemented method of claim 1, wherein the second user is not a direct connection of the first user on the social networking system.

6. The computer-implemented method of claim 1, wherein generating the feed for the first user comprises:
determining whether the content was posted by the second-user on the third-party application at a time such that the post is within some number of the most recent content items for the first user; and
responsive to determining that the content was posted by the second-user on the third-party application at a time such that the post is within some number of the most recent content items for the first user, including the post within the feed for the first user.

7. The computer-implemented method of claim 1, further comprising polling the third-party application to determine whether the second user has posted content on the third-party application.

8. A non-transitory computer-readable storage medium comprising:
instructions for receiving, by a social networking system from a remote system hosting a third-party application, the remote system different from the social networking system, a notification that a first user has a unidirectional connection with a second user on the third-party application, wherein the first user has a first social networking user account on the social networking system and the second user has a second social networking user account on the social networking system that is different from the first social networking user account, and wherein the first user has a first third-party user account on the third-party system and the second user has a second third-party user account on the third-party system;
instructions for receiving, by the social networking system from the third-party application, a notification that the second user has posted content on the third-party application;
instructions for generating, by the social networking system, a feed for the first user, the feed comprising a post that contains at least a portion of the content posted by the second user on the third-party application, the post being attributed to the second social networking user account of the second user; and
instructions for sending, by the social networking system, the feed for display to a client device of the first user, wherein the social networking system and the third-party application are different from the client device of the first user.

9. The non-transitory computer-readable storage medium of claim 8, further comprising:
instructions for receiving, from the third-party application, an identifier of the account of the second user on the third-party application and an identifier of an account of the second user on the social networking system; and
instructions for storing a mapping comprising:
the identifier of the account of the second user on the third-party application, and
the identifier of the account of the second user on the social networking system.

10. The non-transitory computer-readable storage medium of claim 9, wherein the notification that the second user has posted content on the third-party application comprises an identifier of the second user on the third-party application, the non-transitory computer-readable storage medium further comprising:
instructions for determining the identifier of the account of the second user on the social networking system using the stored mapping; and
instructions for attributing the post to the user account of the second user on the social networking system by displaying, in visual association with the at least a portion of the content, a user name of the user account of the second user on the social networking system.

11. The non-transitory computer-readable storage medium of claim 8, further comprising:
instructions for updating a social graph of the social networking system to indicate that the first user is following the second user; and
instructions for determining, based on the social graph, that the content posted by the second user should be included in the feed for the first user.

12. The non-transitory computer-readable storage medium of claim 8, wherein the second user is not a direct connection of the first user on the social networking system.

13. The non-transitory computer-readable storage medium of claim 8, wherein generating the feed for the first user comprises:
determining whether the content was posted by the second-user on the third-party application at a time such that the post is within some number of the most recent content items for the first user; and
responsive to determining that the content was posted by the second-user on the third-party application at a time such that the post is within some number of the most recent content items for the first user, including the post within the feed for the first user.

14. The non-transitory computer-readable storage medium of claim 8, further comprising instructions for polling the third-party application to determine whether the second user has posted content on the third-party application.

* * * * *